United States Patent
Miyamoto et al.

(10) Patent No.: US 6,832,736 B2
(45) Date of Patent: Dec. 21, 2004

(54) PROCESSING METHOD OF DISPOSALS AND COLLECTING METHOD OF FOAMING GAS FROM FOAMING HEAT-INSULATOR MATERIAL THEREOF, AND DISPOSAL PROCESSING APPARATUS AND COLLECTING APPARATUS THEREOF

(75) Inventors: Tetsurou Miyamoto, Chiyoda (JP); Kanji Fujimori, Kudamatsu (JP); Eiji Satou, Chiyoda (JP); Masakatsu Hayashi, Ushiku (JP); Chihiro Fukumoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 383 days.

(21) Appl. No.: 09/778,787

(22) Filed: Feb. 8, 2001

(65) Prior Publication Data

US 2001/0013558 A1 Aug. 16, 2001

(30) Foreign Application Priority Data

Feb. 10, 2000 (JP) ........................................ 2000-038147

(51) Int. Cl.⁷ ............................................... B02C 19/12
(52) U.S. Cl. .............................. 241/19; 241/29; 241/30; 241/34; 241/79.1
(58) Field of Search ........................... 241/30, 34, 79.1, 241/37.5, 31, 29, 19

(56) References Cited

U.S. PATENT DOCUMENTS 5,740,725 A  *  4/1998  Tomizawa et al. ............ 100/92

FOREIGN PATENT DOCUMENTS

| AT | 389489 | | 12/1989 |
|---|---|---|---|
| DE | 4004336 | | 9/1991 |
| DE | 4027056 | | 3/1992 |
| DE | 19509900 | | 9/1996 |
| JP | 09-087415 | * | 3/1997 |
| JP | 09-239351 | * | 9/1997 |
| JP | 11-090933 | * | 4/1999 |
| WO | 93/22119 | | 11/1993 |

* cited by examiner

*Primary Examiner*—Mark Rosenbaum
(74) *Attorney, Agent, or Firm*—Antonelli, Terry, Stout & Kraus, LLP

(57) ABSTRACT

In a collecting method and a collecting apparatus for collecting foaming gas generated from foaming heat insulator material, as well as in a processing process and apparatus of disposals, disposals 1 including the foaming heat insulator material 5 are charged into a first and a second crushing machines 3 and 17 for separating the foaming gas contained in the foaming heat insulator material 5 thereof, and the separated foaming gas is collected by a collector 29, wherein measurement is made on the concentration of flammable gas separated, so as to control the charging of the disposals 1 and the foaming heat insulator material 5 into the first and second crushing machines 3 and 17, depending upon that concentration measured, thereby collecting the foaming gas with high efficiency, while controlling the concentration of the flammable gas, appropriately and with ease, and an charge amount thereof to be charged, appropriately, depending upon the concentration of that flammable gas contained therein.

10 Claims, 8 Drawing Sheets

PROCESSING METHOD OF DISPOSALS AND COLLECTING METHOD OF FOAMING GAS FROM FOAMING HEAT-INSULATOR MATERIAL THEREOF, AND DISPOSAL PROCESSING APPARATUS AND COLLECTING APPARATUS THEREOF

BACKGROUND OF THE INVENTION

The present invention relates to a processing method of disposals and a collecting method of foaming gas generated therefrom, as well as a disposal processing apparatus for processing disposals and a collecting apparatus for collecting foaming gas generated from the foaming heat insulator material thereof, and in particular it relates to a disposal processing method and a forming gas collecting method, as well as a disposal processing apparatus and a forming gas collecting apparatus, being suitable for collecting the foaming gas from the foaming heat insulator material which is contained in disposals of, such as a cooling apparatus, etc.

Conventionally, a collecting method and a collecting apparatus are already known, for collecting foaming gas from the foaming heat insulator material, for example, by Japanese Patent Laying-Open No. Hei 9-239351 (1997) <Conventional art 1>, as will be described below.

In this conventional art 1 relating to a crushing machine, there are proposed a method and an apparatus for collecting the foaming gas generated from the foaming heat insulator material, suitably and with safety depending upon the kind thereof, but without examining or investigating the foaming gas in advance, and it comprises a crushing machine equipped with a gas detector means, a conveyer for transmitting the crushed pieces which are taken out from the crushing machine, and a processing apparatuses for those crushed pieces, wherein the kind of gas within the foaming heat insulator material is detected, so as to change over the processing apparatuses for the crushed pieces by exchanging the transmission routes thereof, as a post-processing of the crushed pieces, depending upon the kind of gas detected.

And, in this conventional art 1, relating to the crushing machine, the concentration of gas may comes up from a several % to a ten and several % when the foaming heat insulator material is crushed into fine pieces, if the crushed pieces contain a cyclopentane gas therein, therefore, the gas detector is provided within a crushing and compressing apparatus, and onto a dust hopper are further provided an air suction valve and a gas discharge valve, wherein the air suction valve and the gas discharge valve are opened when a flammable gas is detected, so as to purge such an explosive gas within a system, as a discharge gas therefrom, by means of the suction air, thereby controlling the gas concentration within the system, to be in the outside of explosive limits thereof.

Also, as other collecting method and collecting apparatus of the conventional art, for collecting foaming gas from the foaming heat insulator material, there is further known a technology, as described by Japanese Patent Laying-Open No. Hei 9-87415 (1997), for example, in which, for the purpose of collecting flon (or fleon) gas from the disposals having a possibility of containing the cyclopentane other than the flon therein, but without bringing about explosion due to the cyclopentane during the collection thereof, at least a crushing process is put into practice under an atmosphere of a saturated vapor pressure or an inert gas when the disposals are crushed to be collected with the foaming material therefrom, while to extract a foaming gas (i.e., the flon) therefrom so as to collect it through liquefaction thereof, and existence of the cyclopentane is detected, wherein the atmosphere of the processes after that is changed into the same one to that of the crushing process if the cyclopentane is detected <Conventional art 2>.

Moreover, as other collecting method and collecting apparatus of the conventional art, for collecting foaming gas from the foaming heat insulator material, there is further known a technology, as be described by Japanese Patent Laying-Open No. Hei 11-90933 (1999), for example, in which, for the purpose of providing an apparatus for taking the safety in the collecting operation thereof into the consideration, as well as of protecting from the burning or explosion due to mixture of the flammable foaming gas which is separated from the foaming heat insulator material, thereby to collect the flammable gas with good efficiency, there is proposed an apparatus comprising a crushing machine for crushing cooling apparatuses as the disposals, an absorbing and liquefying apparatus for collecting the foaming gas generating within a space of that crushing apparatus, through liquefying it by means of absorption or desorption thereof, a wind power separator apparatus for separating the foaming heat insulator material from crushed pieces taken out from that crushing machine, a fine crushing machine for dividing each dependent foaming included in the separated foaming heat insulator material between the foaming gas contained therein and resin thereof, by destroying it, a resin volume reducing apparatus for reducing the volume of the resin within an airtight container, so as to be discharged from it, a diluting apparatus for diluting the foaming gas concentration within that fine crushing machine by an air mixed from an outside, and a supplying apparatus for supplying the mixture gas diluted in that diluting apparatus into that absorbing and liquefying apparatus <Conventional art 3>.

However, in the conventional art 1 relating to the crushing machine apparatus, in which the transmission route as the post-process of the crushing machine is exchanged by detecting the kind of the gas generated in the crushing machine, but not controlling the concentration thereof within the crushing machine, and there is described nothing about that an amount to be charged into the crushing machine is controlled so as to control the concentration thereof within the crushing machine.

Also, in the conventional art 2, the crushing process is carried out under the atmosphere of the saturated vapor pressure or the inert gas, while detecting the existence of the cyclopentane, and the atmosphere of the processes after that is changed into that being same to the atmosphere of the crushing process, therefore there must be provided facilities for bringing the crushing process into the atmosphere of the saturated vapor pressure or the inert gas, and further other necessity of bringing the processes after the crushing process into closed structure, for maintaining them in the same atmosphere to that of the crushing process.

Further, in the conventional art 3, the air mixed from the outside dilutes the foaming gas concentration within the fine crushing machine apparatus, and that mixture gas diluted is supplied to the absorbing and liquefying apparatus, therefore a capacity necessary for collecting the gas is increased, so far as it is diluted for improving the safety thereof, and it decrease the efficiency of collection thereof.

SUMMARY OF THE INVENTION

An object of the present invention, therefore, is to provide a collecting method and the collecting apparatus, as well as a processing method and a processing apparatus of disposals, being able to collect the foaming gas with high efficiency, wherein the concentration of a flammable gas is controlled appropriately, so that the safety of the crushing machine can be obtained with ease if the flammable and inflammable foaming heat insulator materials are mixed to be charged into, as well as the charge amount of the foaming heat insulator material is controlled depending upon the concentration of the flammable gas thereof.

According to the present invention, for accomplishing the above object, there is provided a collecting method for collecting foaming gas from foaming heat insulator material, comprising following steps:

a step for charging the foaming heat insulator material into a crushing machine; a step for separating the foaming gas contained within said foaming heat insulator material charged in said crushing machine; a step for collecting the foaming gas from an air, including said separated foaming gas therein, by means of a collector; a step for measuring concentration of flammable gas within the air including said separated foaming gas therein; and a step for controlling the charging of the foaming heat insulator material into said crushing machine depending upon the measured concentration of the flammable gas.

Also, according to the present invention, there is provided a collecting method for collecting foaming gas from foaming heat insulator material, comprising following steps: a step for charging the foaming heat insulator material into a crushing machine; a step for separating the foaming gas contained within said foaming heat insulator material charged in said crushing machine; a step for collecting the foaming gas from an air, including said separated foaming gas therein, by a collector; a step for measuring concentration of flammable gas within the air including said separated foaming gas therein; a step for determining the measured concentration by a plural number of concentration levels being higher than a normal concentration; and a step for conducting reduction of an charge amount of the foaming heat insulator material into said crushing machine or stoppage of charge thereof, selectively, depending upon the determination by the plural number of levels.

Also, according to the present invention, there is provided a collecting method for collecting foaming gas from foaming heat insulator material, comprising following steps: a step for charging the foaming heat insulator material into a first crushing machine; a step for crushing said charged foaming heat insulator material charged by said first crushing machine; a step for charging the crushed foaming heat insulator material into a second crushing machine; a step for crushing the charged foaming heat insulator material further finely by said second crushing machine; a step for collecting the foaming gas from an air, including the foaming gas separated from said foaming heat insulator material in said first crushing machine and said second crushing machine, by means of a collector; a step for measuring concentration of flammable gas within the air including the foaming gas separated in said second crushing machine; and a step for controlling the charging of the foaming heat insulator material into said first crushing machine and the charging of the foaming heat insulator material into said second crushing machine, depending upon the measured concentration of the flammable gas.

Also, according to the present invention, there is provided a collecting method for collecting foaming gas from foaming heat insulator material, comprising following steps: a step for charging the foaming heat insulator material into a first crushing machine; a step for crushing said charged foaming heat insulator material charged by said first crushing machine; a step for charging the crushed foaming heat insulator material into a second crushing machine; a step for crushing the charged foaming heat insulator material further finely by said second crushing machine; a step for collecting the foaming gas from an air, including the foaming gas separated from said foaming heat insulator material in said first crushing machine and said second crushing machine, by means of a collector; a step for measuring concentration of flammable gas within the air including the foaming gas separated in said first crushing machine; a step for measuring concentration of flammable gas within the air including the foaming gas separated in said second crushing machine; a step for controlling the charging of the foaming heat insulator material into said first crushing machine, depending upon a measurement result of concentration in said first crushing machine; and a step for controlling the charging of the foaming heat insulator material into said first crushing machine and the charging of the foaming heat insulator material into said second crushing machine, depending upon a measurement result of concentration in said second crushing machine.

Also, according to the present invention, there is further provided a collecting method for collecting foaming gas from foaming heat insulator material, comprising following steps: a step for charging the foaming heat insulator material into a crushing machine by means of a plurality of charging machines; a step for separating the foaming gas contained within said foaming heat insulator material charged in said crushing machine; a step for collecting the foaming gas from an air, including said separated foaming gas therein, by means of a collector; a step for measuring concentration of flammable gas within the air including said separated foaming gas therein; and a step for controlling the charging of the foaming heat insulator material into said crushing machine by means of at least one of said plurality of charging machines, with priority, depending upon the measured concentration of the flammable gas.

And, according to the present invention, there is provided a collecting method for collecting foaming gas from foaming heat insulator material, comprising following steps: a step for charging disposals into a first crushing machine; a step for crushing said charged disposals by means of said first crushing machine; a step for separating crushed pieces into one including the foaming heat insulator material and the other than that, by means of a wind power separating apparatus; a step for charging the separated pieces, being crushed and including the foaming heat insulator material therein, into a second crushing machine; a step for crushing the charged foaming heat insulator material by means of said second crushing machine; a step for collecting specific flon and cyclopentane from an air, including the foaming gas separated from said foaming heat insulator material in said first crushing machine and said second crushing machine, independently, by means of an absorbing and liquefying apparatus; a step for measuring concentration of the cyclopentane within the air, including the foaming gas separated in said first crushing machine; a step for measuring concentration of the cyclopentane within the air, including the foaming gas separated in said second crushing machine; a step for controlling the charging of the disposals into said first crushing machine upon basis of a measurement result on the concentration in said first crushing machine; a step for controlling the charging of the foaming heat insulator material into said first crushing machine and the charging of the foaming heat insulator material into said second crushing machine, upon basis of a measurement result on the concentration in said second crushing machine.

Furthermore, according to the present invention, for accomplishing the object mentioned above, there is provided a collecting apparatus for collecting foaming gas from foaming heat insulator material, comprising: a charging machine for charging the foaming heat insulator material; a crushing machine for separating the foaming gas contained within said charged foaming heat insulator material; a collector for collecting the foaming gas from an air, including said separated foaming gas therein; a measurement apparatus for measuring concentration of flammable gas within the air, including said separated foaming gas therein; and a controller apparatus for controlling the charging of the foaming heat insulator material into said crushing machine, depending upon the measured concentration of the flammable gas.

Also, according to the present invention, there is provided a collecting apparatus for collecting foaming gas from foaming heat insulator material, comprising: a charging machine for charging the foaming heat insulator material; a crushing machine for separating the foaming gas contained within said charged foaming heat insulator material; a collector for collecting the foaming gas from an air, including said separated foaming gas therein; a measurement apparatus for measuring concentration of flammable gas within the air, including said separated foaming gas therein; and a controller apparatus for determining the measured concentration by a plural number of concentration levels being higher than a normal concentration, and for selecting between reduction of an charge amount of the foaming heat insulator material into said crushing machine and stoppage of charge thereof, depending upon the determination by the plural number of levels.

Also, according to the present invention, there is further provided a collecting apparatus for collecting foaming gas from foaming heat insulator material, comprising: a charging machine for charging the foaming heat insulator material; a first crushing machine for crushing said foaming heat insulator material charged therein; a second charging machine for charging the crushed foaming heat insulator material; a second crushing machine for crushing the charged foaming heat insulator material finely further more; a collector for collecting the foaming gas from an air, including the foaming gas separated from said foaming heat insulator material in said first crushing machine and said second crushing machine therein; a measurement apparatus for measuring concentration of flammable gas within the air, including the foaming gas separated in said second crushing machine therein; and a control apparatus for controlling the charging of the foaming heat insulator material into said first crushing machine and the charging of the foaming heat insulator material into said second crushing machine, depending upon the measured concentration of the flammable gas.

Furthermore, according to the present invention, there is provided a collecting apparatus for collecting foaming gas from foaming heat insulator material, comprising: a charging machine for charging the foaming heat insulator material; a first crushing machine for crushing said foaming heat insulator material charged therein; a second charging machine for charging the crushed foaming heat insulator material; a second crushing machine for crushing the charged foaming heat insulator material finely further more; a collector for collecting the foaming gas from an air, including the foaming gas separated from said foaming heat insulator material in said first crushing machine and said second crushing machine therein; a measurement apparatus for measuring concentration of flammable gas within the air, including the foaming gas separated in said first crushing machine therein; a second measurement apparatus for measuring concentration of flammable gas within the air, including the foaming gas separated in said second crushing machine therein; and a control apparatus for controlling the charging of the foaming heat insulator material into said first crushing machine depending upon the measured concentration in said first crushing machine, as well as, for controlling the charging of the foaming heat insulator material into said first and the charging of the foaming heat insulator material into said second crushing machine depending upon the measured concentration in said second crushing machine.

Also, according to the present invention, there is further provided a collecting apparatus for collecting foaming gas from foaming heat insulator material, comprising: a plural number of charging machines for charging the foaming heat insulator material; a crushing machine for crushing said foaming heat insulator material charged therein; a collector for collecting the foaming gas from an air, including said separated foaming gas therein; a measurement apparatus for measuring concentration of flammable gas within the air, including said separated foaming gas therein; and a controller apparatus for controlling the charging of the foaming heat insulator material into said crushing machine by means of at least one of said plurality of charging machines, with priority, depending upon the measured concentration of the flammable gas.

Also, according to the present invention, there is further provided a collecting apparatus for collecting foaming gas from foaming heat insulator material, comprising: a charging machine for charging disposals; a first crushing machine for crushing said charged disposals; a wind power separator apparatus for separating crushed pieces into one including the foaming heat insulator material and the other than that; a second charging machine for charging the separated pieces, being crushed and including the foaming heat insulator material therein; a second crushing machine for crushing the charged foaming heat insulator material; an absorbing and liquefying apparatus for collecting specific flon and cyclopentane from an air, including the foaming gas separated from said foaming heat insulator material in said first crushing machine and said second crushing machine, independently; a measurement apparatus for measuring concentration of the cyclopentane within the air, including the foaming gas separated in said first crushing machine; a second measurement apparatus for measuring concentration of the cyclopentane within the air, including the foaming gas separated in said second crushing machine; and a controller apparatus for controlling the charging of the disposals into said first crushing machine upon basis of a measurement result on the concentration in said first crushing machine, as well as, for controlling the charging of the foaming heat insulator material into said first crushing machine and the charging of the foaming heat insulator material into said second crushing machine, upon basis of a measurement result on the concentration in said second crushing machine.

And, according to the present invention, there is provided a collecting apparatus for collecting foaming gas from foaming heat insulator material, comprising: a charging machine for charging disposals; a first crushing machine for crushing said charged disposals; a wind power separator apparatus for separating crushed pieces into one including the foaming heat insulator material and the other than that; a first dust collector for storing crushed pieces including the separated foaming heat insulator material, temporally, by giving suction force to said wind power separator; a second charging machine for charging the crushed pieces, including the foaming heat insulator material therein, upon receipt thereof; a second crushing machine for crushing the charged foaming heat insulator material; a second dust collector for sucking the air, including the foaming gas from said foaming heat insulator material in said crushing machine and said second crushing machine; an absorber supply pipe for supplying the air, including said foaming gas therein, through a supply exchange valve from said second dust collector; an absorbing and liquefying apparatus for collecting specific flon and cyclopentane from the supplied air, including the foaming gas therein, independently; a measurement apparatus for measuring concentration of the cyclopentane within the air, including the foaming gas separated in said first crushing machine; a second measurement apparatus for measuring concentration of the cyclopentane within the air, including the foaming gas separated in said second crushing machine; and a controller apparatus for controlling the charging of the disposals into said first crushing machine upon basis of a measurement result on the concentration in said first crushing machine, as well as, for controlling the charging of the foaming heat insulator material into said first crushing machine and the charging of the foaming heat insulator material into said second crushing machine, upon basis of a measurement result on the concentration in said second crushing machine.

Furthermore, according to the present invention, there is provided a processing method of disposals containing heat-insulator material, which generates forming gas therefrom, comprising the following steps: a step for crushing the disposals by means of a crushing machine; a step for separating crushed pieces of the disposals which are crushed; a step of measuring concentration of a flammable gas by a flammable gas concentration measuring apparatus, which is provided in said crushing machine; and a step of adjusting charge of the disposals into said crushing machine.

And further, according to the present invention, there is provided a processing apparatus of disposals containing heat-insulator material, which generates forming gas therefrom, comprising the following steps: a crushing machine, into which the disposals are charged, for crushing the disposals charged into; a separator for separating pieces of the disposals crushed by said crushing machine; a gas concentration measuring apparatus for measuring concentration of a flammable gas within said crushing machine; and an apparatus for adjusting charging amount of the disposals into said crushing machine.

DETAILED DESCRIPTION OF PREFERRED EMBODIMENTS

Figure 1:
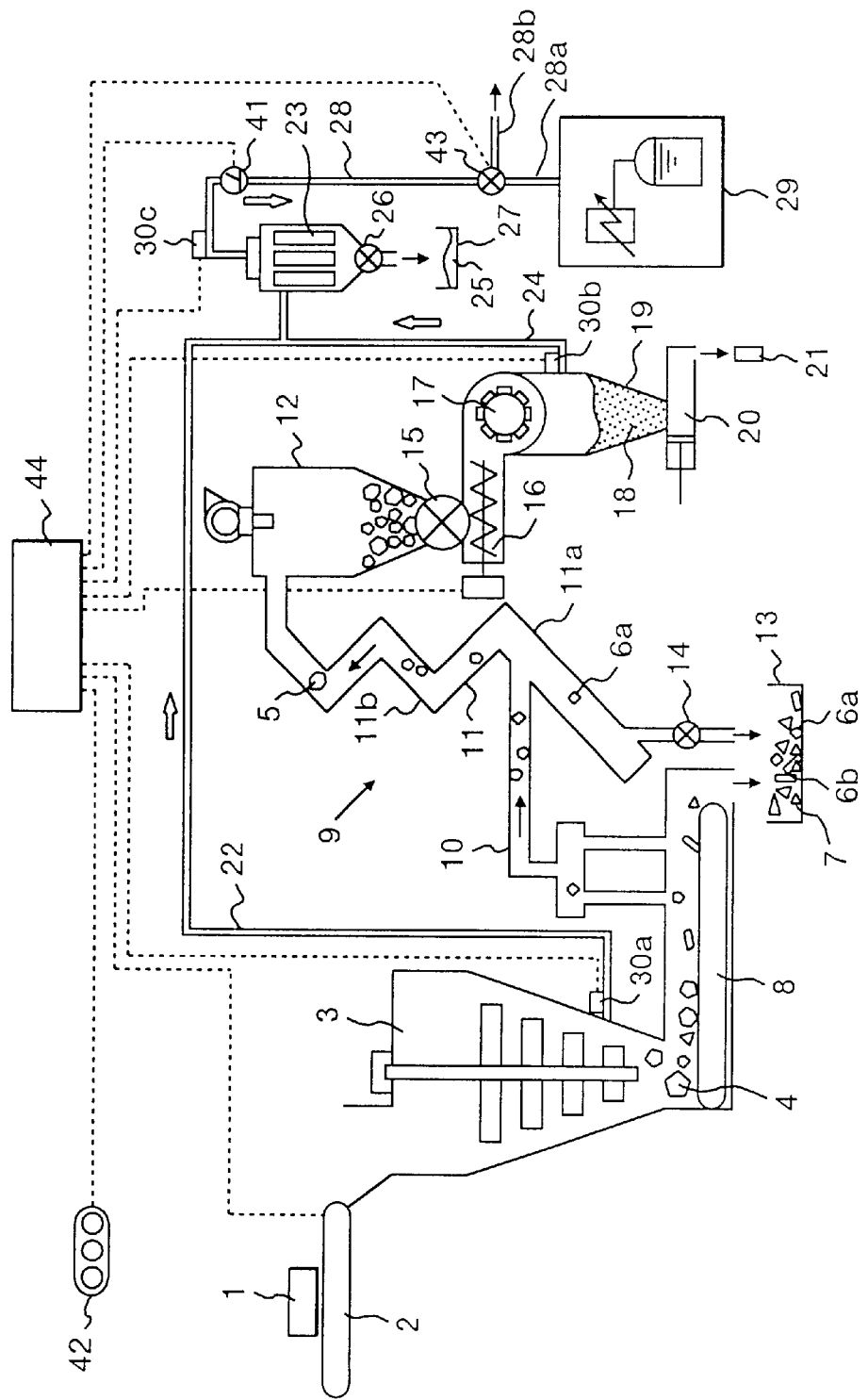
FIG. 1 shows the structure of a collecting apparatus of foaming gas from foaming heat insulator material, according to a first embodiment of the present invention.

Hereinafter, each of the embodiments according to the present invention will be fully explained by referring to the attached drawings. However, duplicate explanation of a second embodiment and the thereafter will be omitted, which is common with that of a first embodiment. In the drawings for each of the embodiments, the same reference numeral indicates the same thing or element or corresponding one thereof.

First of all, explanation will be given on a first embodiment of the present invention, by referring to attached FIGS. 1 to 5.

At first, a total construction of the first embodiment and an operation thereof will be explained by referring to FIG. 1. The FIG. 1 shows the structure of a collection apparatus of foaming gas of foaming heat insulator material, according to the first embodiment of the present invention.

In the FIG. 1, disposals 1, including therein cooling apparatuses, etc., are thrown or charged into a first crushing machine 3 by means of a crushing and charging machine 2 constructing a throwing apparatus, thereby coming to be crushed pieces 4. Further, those cooling apparatuses, etc., mean apparatuses, each having foaming heat insulator materials therein, such as, a refrigerator, a showcase, an automat, etc. Also, the crushing and charging machine 2 is a machine that is able to charge the disposals 1 into, with continuity, and is constructed with a belt conveyer, etc., for example. Herein, the crushed pieces 4 include crushed foaming heat insulator material 5, plastic pieces 6 and metal pieces 7, etc., therein. The crushed pieces 4 are transmitted to a lower portion of a wind power separator apparatus 9 on the belt conveyer 8.

The wind power separator apparatus 9 is constructed with an air-transportation pipe 10 and a wind power selector apparatus 11. The air-transportation pipe 10 has an entrance opening at a lower end thereof, which is opened to an upper portion of the belt conveyer 8, and an upper end thereof is communicated with the wind power selector apparatus 11. Also, the wind power selector apparatus 11 is constructed with a slope portion 11a and a zigzag portion 11b, wherein a rotary valve 14 for use of discharging plastic is connected to a lower portion of the slope portion 11a, while an upper portion of the zigzag portion 11b is connected to a dust collector or chamber 12. The wind power separator apparatus 9 separates the crushed pieces 4 by means of a sucking force of the dust collector 12.

When the crushed pieces 4 are transmitted into the lower portion of the wind power separator apparatus 9, the foaming heat insulator material 5 and the plastic pieces 6a, having relatively light weight, are transferred upward at the entrance opening of the air transporting pipe 10, while the heavy materials, such as the heavy plastic pieces 6b and the metal pieces 7, are transmitted on the belt conveyer 8 as they are, to be separated into a heavy material collector portion 13. The foaming heat insulator material pieces 5 and the plastic pieces 6a, being transferred upward at the entrance opening of the air transporting pipe 10, are separated by the wind power selector apparatus 11; i.e., the foaming heat insulator material pieces 5 into the dust collector 12, while the plastic pieces 6a through the rotary valve 14 for use of discharging plastic into the heavy material collector portion 13.

The foaming heat insulator material 5, which is stored in the dust collector 12 temporarily, is supplied into a second crushing machine 17 through a rotary valve 15, which is provided in a lower portion of the dust collector 12, by the function of a screw feeder 16, thereby being crushed by this second crushing machine 17. Resin 18 of this crushed foaming heat insulator material is stored in a tank 19. Also, the resin 10 stored is reduced in the volume thereof by the function of a resin compressor apparatus 20, which is provided in a lower portion of the second crushing machine 17, so as to be discharged therefrom, as compressed forming parts or articles thereof. However, the resin compressor apparatus 20 is air-tightly sealed, so that the gas within the tank 19 will not leak outside.

On a while, the foaming gas contained within the foaming heat insulator material 5 is collected in a manner, which will be mentioned below. When the disposals 1 of the cooling apparatus, etc., is crushed in the first crushing machine 3, the foaming gas is divided from the foaming heat insulator material 5, to be generated within the first crushing machine 3. And, the air within the space of the first crushing machine 3, including this foaming gas therein, is sucked into a dust collector 23 through an air transportation pipe 22. Also, crushing it finely in the second crushing machine 17 destroys each foaming lying dependently within the foaming heat insulator material 5, thereby separating the resin 10 and the foaming gas in the independent foam. The foaming gas is also sucked into the dust collector 23 through an air transportation pipe 24. In the dust collector 23, the air containing the sucked foaming gas and dust 25 mixed when it is sucked are separated. This air containing the sucked foaming gas therein is sent through an absorber supply pipe 28 to an absorbing and liquefying apparatus 29, functioning as a collector, and the foaming gas is collected therein. Also, the dust 25 separated is collected through a rotary valve 26 into a dust-collecting container 27, which is provide in a lower portion of the dust collector 23.

Also, in a suction opening formed from the first crushing machine 3 to the air transportation pipe 22, there is provided a measuring apparatus 30a for measuring the concentration of flammable gas, which always sends a signal depending upon that concentration of flammable gas to a plant controller apparatus 44. In the same manner, a measuring apparatus 30b for measuring the concentration of flammable gas is provided in a suction opening from the second crushing machine 17 to the air transportation pipe 24, and also a measuring apparatus 30c for measuring the concentration of flammable gas in a suction opening from the dust collector 23 to the absorber supply pipe 28, thereby sending signals depending upon the respective concentrations of those flammable gases to the plant controller apparatus 44. Further, the plant controller apparatus 44 sends signals to the crushing and charging machine 2, the screw feeder 16 and a supply exchange valve 43, which is provided on the absorber supply pile 28, and at the same time displays a concentration information of the flammable gas at the preset on a condition display device 42.

Also, in a case where a flow amount measured by a flow meter 41 which is provided in the absorber supply pipe 28 is lower than a normal region, a signal indicative thereof is sent to the plant controller apparatus 44, so that the supply through the crushing and throwing apparatus 2 and the screw feeder 16 is stopped by means of the plant controller apparatus 44, and an alarm is displayed for notifying an abnormality of the apparatus by the function of the condition display device 42. With this, it is possible to prevent the flammable gas from being increased in the concentration thereof, in advance, even if the capacity of collecting the foaming gas is reduced down due to clogging in the dust collector 23, etc.

Herein, detailed explanation will be given on the absorbing and liquefying apparatus 29 by referring to FIG. 2. The FIG. 2 shows the structure of the absorbing and liquefying apparatus 29, which is applied or used in the collecting apparatus shown in the above FIG. 1.

Figure 2:
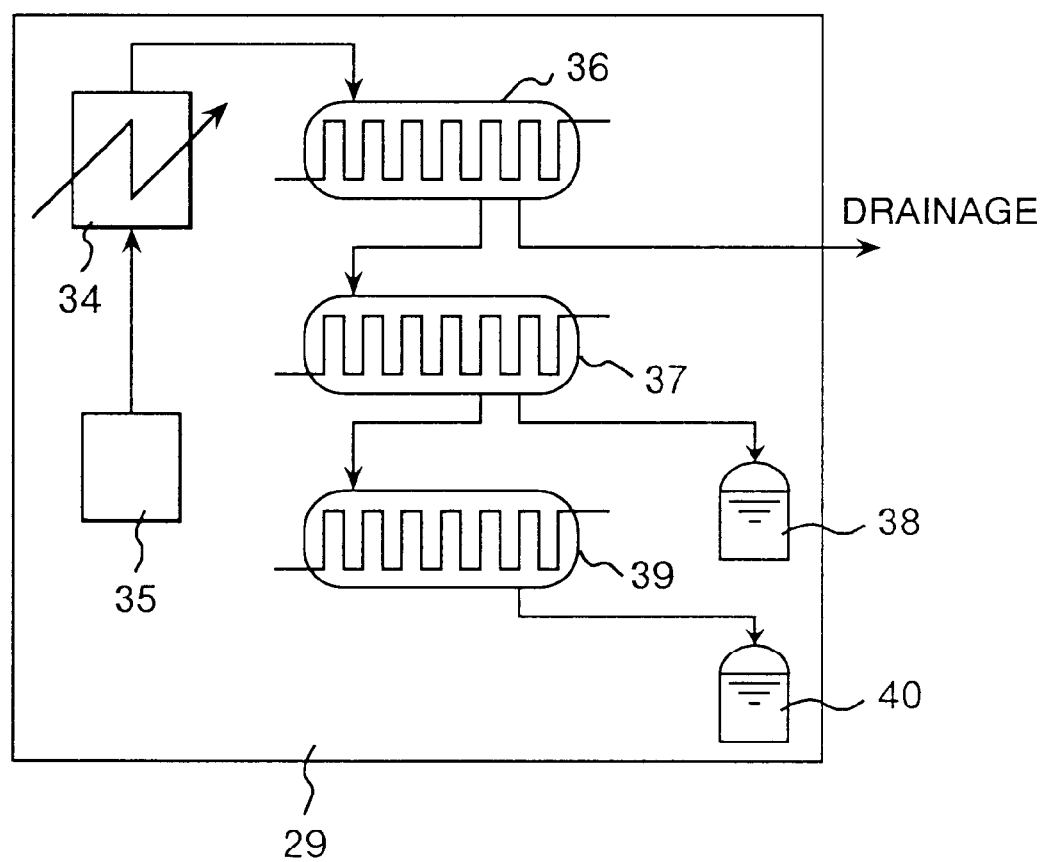
FIG. 2 shows the structure of an absorbing and liquefying apparatus, which is used in the collecting apparatus shown in the FIG. 1.

In the FIG. 2, the foaming gas is absorbed, in an absorption tower 34, from the air containing thereof, which is sent from the absorber supply pipe 28 to the absorbing and liquefying apparatus 29. Explanation will be given on a case where the foaming gas absorbed contains two kinds of gases; such as a specific flon (R-11) and the flammable cyclopentane. Steam is supplied generating from a boiler 35 into the absorption tower 34 at a lower portion thereof, thereby replacing the specific flon and the flammable cyclopentane, which are absorbed by an absorption material. The gases, containing the replaced specific flon and the flammable cyclopentane and further a portion of the steam therein, are sent to a liquefaction apparatus 36. The liquefaction apparatus 36 cools down the temperature of the above-mentioned gases to around 60° C., thereby liquefying water having the boiling point at 100° C. to be discharged therefrom. The remaining gases are sent to a liquefaction apparatus 37. The liquefaction apparatus 37 cools down the temperature of the above-mentioned gases to around 30° C., thereby liquefying the cyclopenatane having the boiling point of about 50° C. to be collected into a collecting container 38. The remaining specific flon is cooled down to be equal 10° C. or lower than that in a liquefaction apparatus 39, thereby being liquefied to be collected into a collecting container 40.

With this absorbing and liquefying apparatus 20, it is possible to collect the plural kinds of the foaming gases by means of a one apparatus, thereby obtaining a low-cost in collecting the foaming gases.

Figure 3:
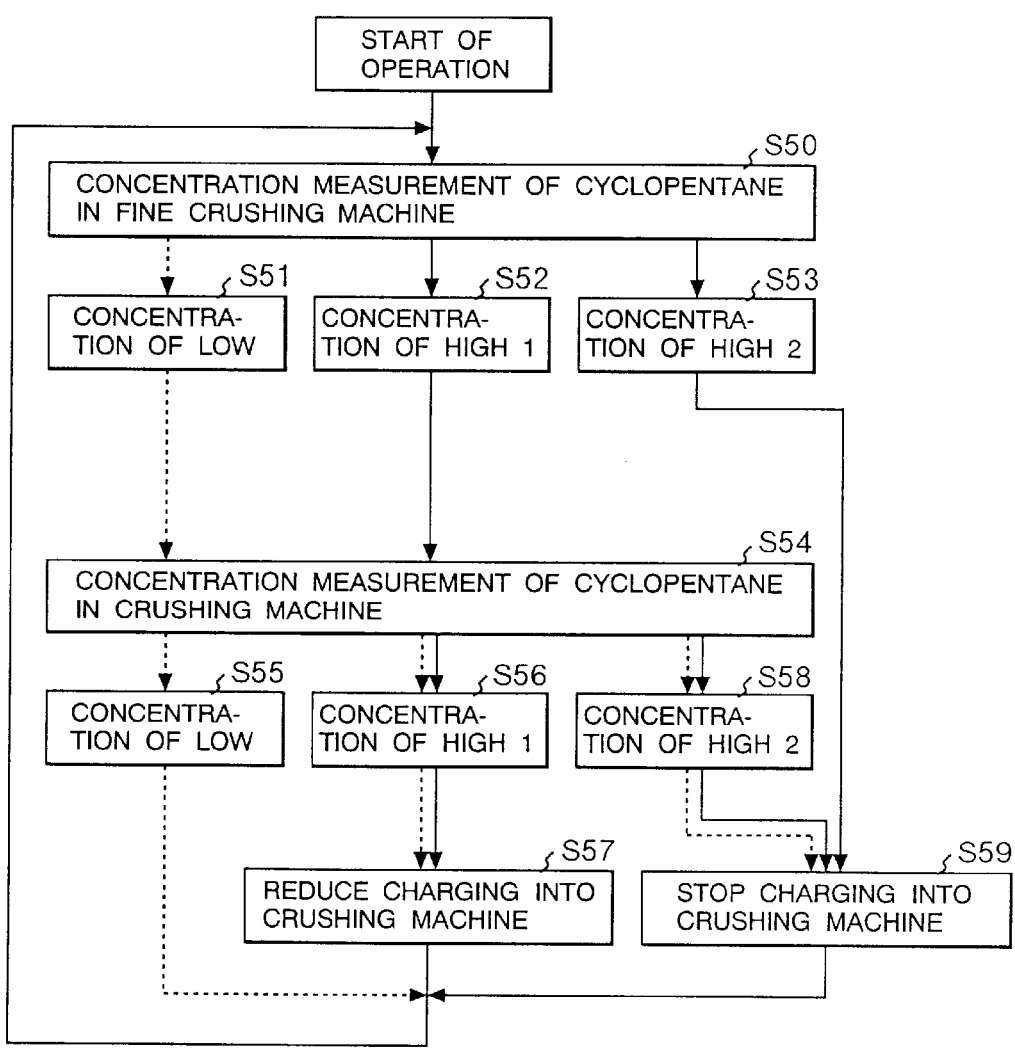
FIG. 3 shows a flowchart for control operation of a first crushing machine in the collecting apparatus shown in the FIG. 1.
Figure 4:
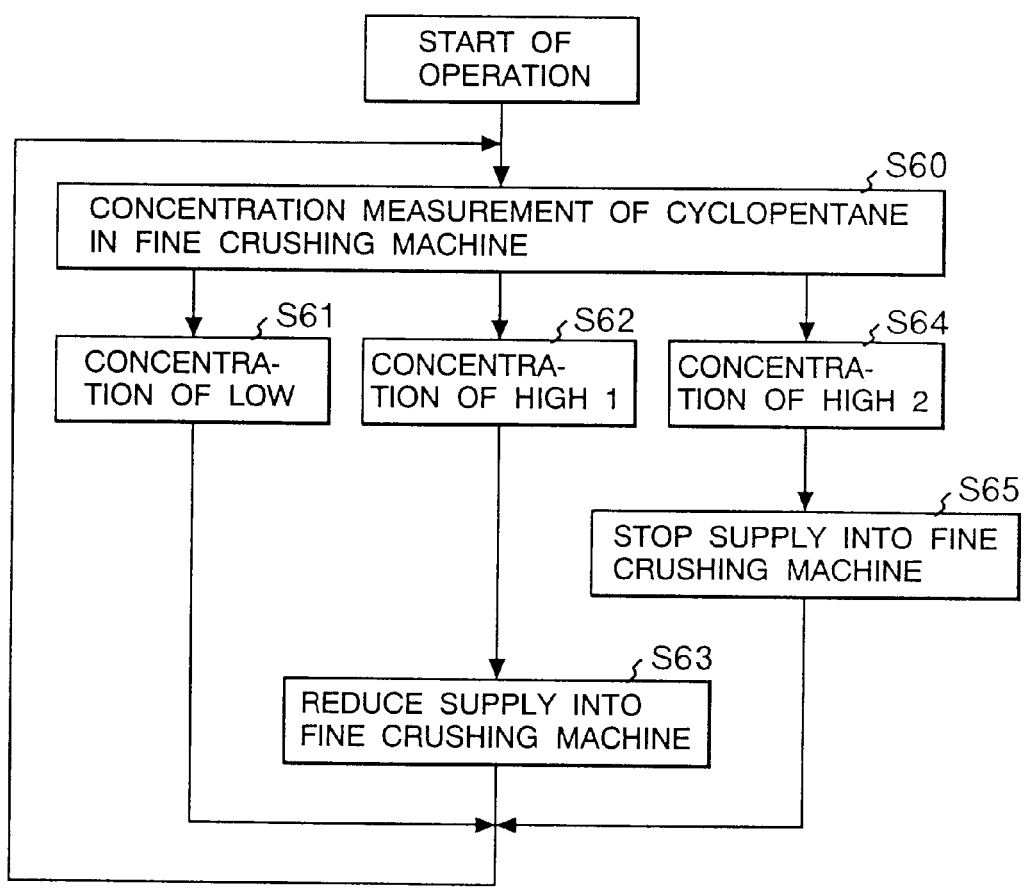
FIG. 4 shows a flowchart for showing control operation of a second crushing machine in the collecting apparatus shown in the FIG. 1.
Figure 5:
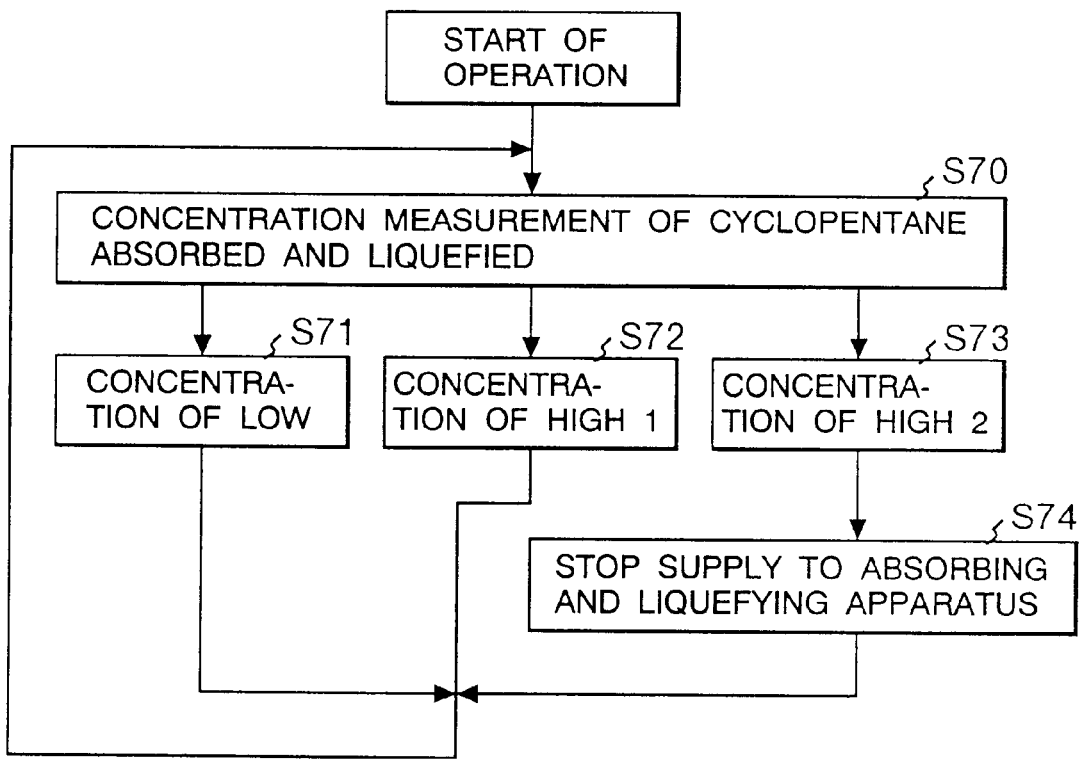
FIG. 5 shows a flowchart for showing control operation of an absorbing and liquefying apparatus shown in the FIG. 1.

Next, explanation will be given on control operation in a case where the flammable gas is contained within the foaming heat insulator material 5, by referring to flowcharts shown in the FIGS. 3 to 5.

The control operation of the first crushing machine 3, relating to the concentration of the flammable gas, will be explained by referring to FIG. 3. The FIG. 3 shows a flowchart of the control operation of the first crushing machine of the collecting apparatus shown in the FIG. 1.

When the operation of the first crushing machine 3 is started, the concentration of the flammable gas in the second crushing machine 17 is measured (S50). This measurement on concentration of flammable gas is made by means of the concentration measuring apparatus 30b, which is provided in the suction opening formed from the second crushing machine 17 to the air transportation pipe 24. This flammable gas measured therewith is the cyclopentane. If the measured concentration of the flammable gas stays at the low level (S51) and if it stays at the high level 1 (S52), the step goes to the measurement on concentration thereof in the first crushing machine 3 (S54), while if the measured concentration of the flammable is at a high level 2 (S53), it proceeds to stoppage of crushing (S59). In this manner, the determination is made on the measured concentration of the flammable, by a plural number of levels thereof. With the determination levels for the concentration, for example, that having a low level means a normal concentration where no explosion or burning can be expected to occur due to the flammable gas, that having a high level 1 means a concentration where the concentration is a little bit higher than that normal low level, and that having a high level 2 means a concentration where it is a little bit lower than the concentration where a danger can be expected that the flammable gas ignites.

In a step S54, the measurement is made on the concentration of flammable gas in the first crushing machine 3. The measurement is made on the concentration of this flammable gas in the first crushing machine 3. The measurement on the concentration of this flammable gas is made by means of the measuring apparatus 30*a* of flammable gas concentration, which is provided in the suction opening from the first crushing machine 3 to the air transportation pipe 22. The flammable gas to be measured is the syclopentane. If the measured concentration of the flammable gas lies to be low (S55), the step comes back to the step S50, and then the first crushing machine 3 continues the normal crushing operation thereof. Otherwise, if the measured concentration of the flammable gas rises up to the high level 1 (S56), a control is made on the crushing amount thereof depending upon this measured concentration (S57). The control on the crushing amount can be achieved by reducing down the charge amount into the first crushing machine 3, depending upon the measured concentration; for example, by slowing down a charging speed of the crushing and charging machine 2, or by charging the disposals intermittently, etc. With this, it is possible to control the concentration without stoppage of the flow in the collecting processes. Also, if the measured concentration of flammable gas further rises up to the high level 2 (S58), the crushing is stopped (S59). This stoppage of crushing is achieved by stopping the charge of the disposals 1 into the first crushing machine 3.

Next, the control operation will be explained, relating to the concentration of flammable gas in the second crushing machine 17, by referring to FIG. 4. The FIG. 4 shows a flowchart of the control operation of the second crushing machine shown in the FIG. 1.

When the operation of the second crushing machine 17 is started, the concentration of flammable gas within the second crushing machine 17 is measured (S60). This measurement on the concentration of the flammable gas is made by means of the concentration measuring apparatus 30*b*, which is provided in the suction opening formed from the second crushing machine 17 to the air transportation pipe 24. This flammable gas measured thereby is the cyclopentane. If the measured concentration of the flammable stays at the low level (S51), the step goes back to the step S60, and then the second crushing machine 17 continues the operation thereof. Also, if the measured concentration of the flammable gas rises up to the high level 1 (S62), a control is made upon the amount of fine crushing, depending upon this concentration measured (S63). This control on the amount of the fine crushing is achieved by reducing down a supply amount of the disposals into the first crushing machine 3 and into the second crushing machine 17, depending upon that measured concentration; i.e., by slowing down supply speeds of the crushing and charging machine 2 and/or the screw feeder 16. Also, if that measured concentration of the flammable gas further rises up to the high level 2 (S64), the fine crushing is stopped (S65). This stoppage of that fine crushing is achieved by stopping the crushing and charging machine 2 and the screw feeder 16, as well as, by stopping the charge of the foaming heat insulator material 5 into the second crushing machine 17.

Further, with setting a third level for the concentration measurement between the high level 1 and the high level 2, so that a dilution gas is sent into the first crushing machine 3 or the second crushing machine 17 when the measured concentration comes up to this third concentration measurement level, in combination with the control upon the charge amount, it is possible to reduce a chance where the charging is stopped into those crushing machines 3 and 17.

Next, the control operation will be explained, relating to the flammable gas in the absorbing and liquefying apparatus 29, by referring to FIG. 5. The FIG. 5 shows a flowchart of the control operation of the absorbing and liquefying apparatus shown in the FIG. 1.

When the operation of the absorbing and liquefying apparatus 29 is started, the concentration is measured on the flammable gas that is supplied to the absorbing and liquefying apparatus 29. This measurement on the concentration of flammable gas is made by means of the concentration measuring apparatus 30*c*, which is provided in the suction opening from the dust collector 23 to the absorber supply pipe 28. This flammable gas measured thereby is the cyclopentane. If the measured concentration of the flammable gas stays at the low level (S71) and if it stays at the high level 1 (S72), the step goes back to the step S70, and the operation thereof is continued in the absorbing and liquefying apparatus 29. Also, if the measured concentration of the flammable gas comes up to the high level 2 (S73), the absorption and liquefaction operation is stopped. This stoppage of the absorption and liquefaction is achieved through exchange of the supply line 28 by means of the supply exchanger valve 43 provided from the absorber supply pipe 28*a* to the absorber by-path valve 28*b*, so as to stop the supply to the absorbing and liquefying apparatus 29.

The controller apparatus provided for controlling the above-mentioned first crushing machine 3, the second crushing machine 17 and the absorbing and liquefying apparatus 29 is the plant controller apparatus, which is constructed with the same micro-computer, etc.

According to the present invention, the flammable gas is measured on the concentration thereof, in the air containing the separated foaming gas therein, so as to control the charging of the disposals 1 having the foaming heat insulator material therein or that of the foaming heat insulator material 5 into the foaming gas separator means 3 or 17, depending upon this measured concentration of the flammable gas, therefore it is possible to control the concentration of the flammable gas, so that a safety can be ascertained on the crushing machine 3 or 17, even if the flammable and non-flammable foaming heat insulator materials are mixed together to be charged thereinto, as well as, to obtain the collection of the foaming gas with a high efficiency, since the charging of the disposals 1 having the foaming heat insulator material therein or the foaming heat insulator material 5 can be controlled appropriately, depending upon the concentration of the flammable gas.

Also, since determination of this measured concentration is made by the plural number of the concentration levels, in a range being higher than that normal concentration, and since the reduction in the charge amount and the stoppage of charging of the foaming heat insulator material into the crushing machines 3 or 17 are selectively made upon the basis of this plural number of the determinations, it is possible to increase up the safety further more.

Moreover, the concentration of the flammable gas is measured in the air containing the separated foaming gas in the second crushing machine 17, so as to control the charging of the foaming heat insulator material (i.e., the disposals) 1 into the first crushing machine 3 and the charging of the foaming heat insulator material 5 into the second crushing machine 17 depending upon that measured concentration of the flammable gas, therefore it is possible to control the amount of the foaming heat insulator material 5 to be supplied from the first crushing machine 3 into the second crushing machine 17 with certainty, as well as, to operate them appropriately.

Also, the concentration of the flammable gas is measured in the air containing the separated foaming gas in the first crushing machine 3, so as to control the charging of the foaming heat insulator material (i.e., the disposals) 1 into the first crushing machine 3 depending upon that measurement result of the concentration thereof, and the concentration of the flammable gas is measured in the air containing the separated foaming gas in the second crushing machine 17, so as to control the charging of the foaming heat insulator material (i.e., the disposals) 1 into the first crushing machine 3 and the charging of the foaming heat insulator material 5 into the second crushing machine 17 depending upon that measurement result of the concentration, as well, therefore it is possible to control both the first crushing machine 3 and the second crushing machine under an appropriate concentration of the flammable gas.

Next, explanation will be given on a second embodiment, according to the present invention, by referring to FIG. 6. The FIG. 6 shows a flowchart of an operation in the second embodiment, according to the present invention.

In this second embodiment, though the construction and the basic operation thereof are nearly equal or same to those of the first embodiment, the concentration measuring apparatus 30 for measuring the concentration of the flammable gas includes only the concentration measuring apparatus 30a which is provided in the suction opening formed from the first crushing machine 3 to the air transportation pipe 22, thereby obtaining simplification of the flowchart thereof.

Figure 6:
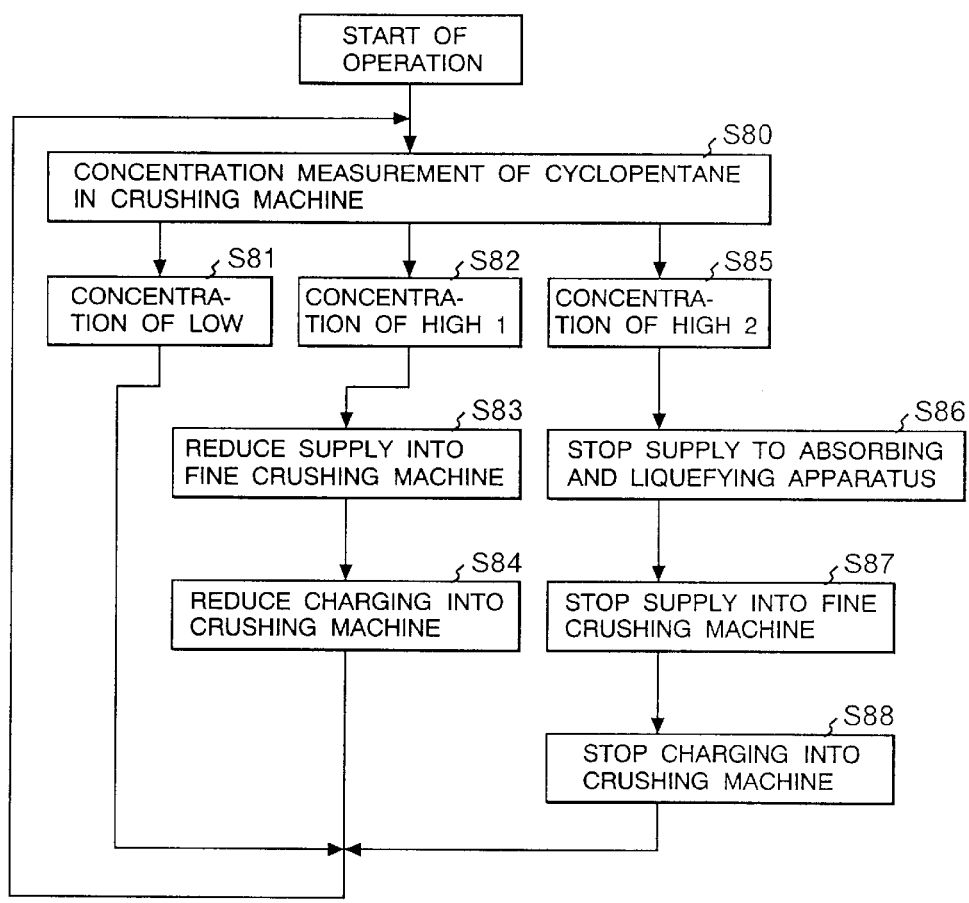
FIG. 6 shows a flowchart for showing control operation in a second embodiment of the present invention.

Namely, as shown in the FIG. 6, when the operation of the collecting apparatus is started, the measurement is made on the concentration of the flammable gas in the first crushing machine 3 (S80). When this measured concentration of the flammable gas is low (S81), the step comes back to the step S80, and the collecting apparatus continues the normal operation thereof. Also, when the measured concentration of the flammable gas rises up to the high level 1 (S82), the control is made on the fine crushing; i.e., reduction in the supply amount of the foaming heat insulator material 5 to be crushed finely (S83), and also on the crushing; i.e., reduction in the supply amount of the disposals 1 to be crushed (S84), depending upon this measured concentration.

Also, when the measured concentration of the flammable gas further rises up to the high level 2 (S85), the supply of the air including the flammable gas into the absorbing and liquefying apparatus 29 is stopped (S86), as well as, the supply of the foaming heat insulator material 5 into the second crushing machine 17 (S87) and the supply of the disposals 1 into the first crushing machine 3 (S88).

However, the concentration of the foaming gas within the second crushing machine 17 is higher than that of the foaming gas within the first crushing machine 3, normally, therefore, it is preferable to set the concentration levels in the concentration measuring apparatus 30a to be a little bit lower, so that the concentration of the foaming gas within the second crushing machine comes to be optimal.

Figure 7:
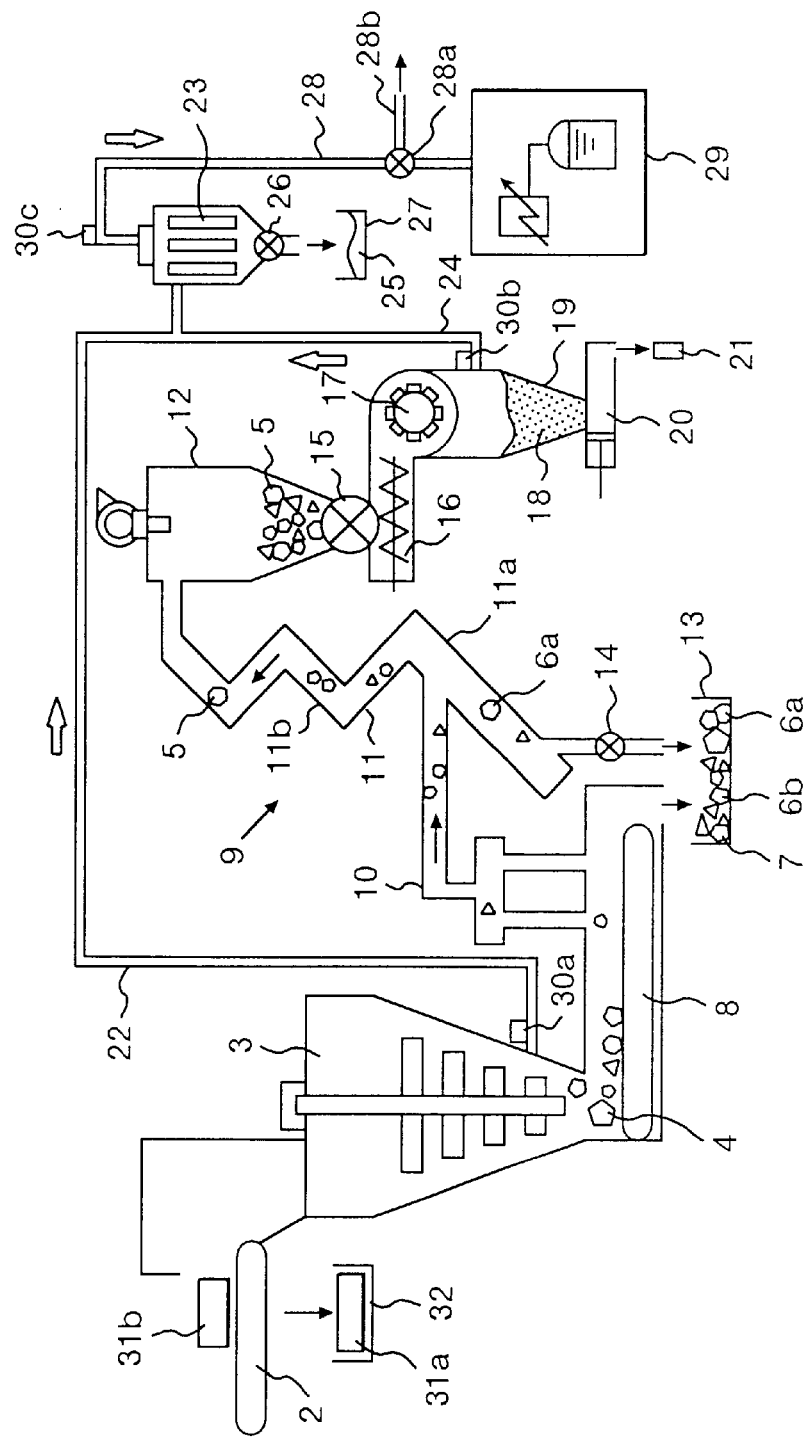
FIG. 7 shows the structure of a collecting apparatus of foaming gas from foaming heat insulator material, according to a third embodiment of the present invention.

Next, explanation will be given on a third embodiment by referring to FIG. 7. The FIG. 7 shows the structure of the collecting apparatus for collecting foaming gas from foaming heat insulator material, according to the third embodiment of the present invention.

Although the basic structure and the operation of this third embodiment are also nearly equal or same to those of the first embodiment, hereinafter, explanation will be given only on the differences thereof from the first embodiment.

In the third embodiment, in general, since each cooling apparatus 31a (or disposal) including the flammable foaming gas therein is attached with an indication that it includes the flammable foaming gas therein, a marking is made on the cooling apparatus 31a including the flammable foaming gas therein, in a stage of pre-processing of the crushing. With this, if the concentration, which is measured by the flammable gas concentration measurement apparatus 31a provided in the first crushing machine 3, comes up to the high level 1 being higher than the normal concentration in the process of crushing, then the cooling apparatus 31a treated with that marking is stored into a temporary storage portion 32, so that only the disposals 31b other than that are charged into the first crushing machine 3 by means of the crushing and charging machine 2. Also, when the concentration higher that the high level 2 is measured by the flammable gas concentration measurement apparatus 30a, the charging of all the disposals is stopped.

With this third embodiment, it is possible to control the concentration of the flammable gas more accurately, comparing to the first embodiment. Further, for the purpose of bringing generation of the flammable gas to be safe and to be constant in the concentration thereof, it is preferable to adjust an amount and an order of the charging of the cooling apparatuses 31a, which include the flammable foaming gas therein, and the disposals 31b other than that, in the stage of pre-processing before the crushing.

Figure 8:
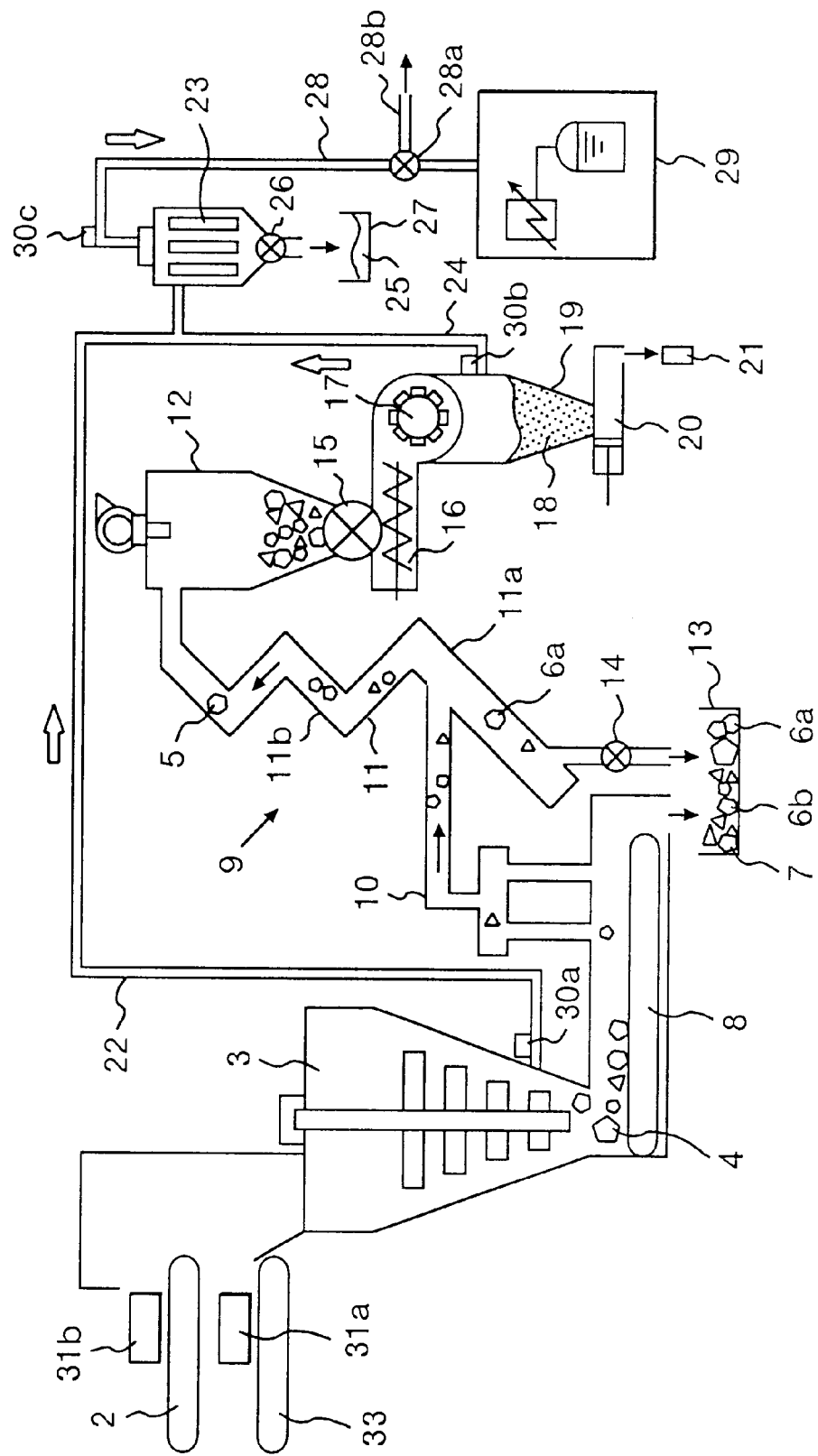
FIG. 8 shows the structure of a collecting apparatus of foaming gas from foaming heat insulator material, according to a fourth embodiment of the present invention.

Next, explanation will be given on a fourth embodiment by referring to FIG. 8. The FIG. 8 shows the structure of the collecting apparatus for collecting foaming gas from foaming heat insulator material, according to the fourth embodiment of the present invention.

Although the basic structure and the operation of this fourth embodiment are also nearly equal or same to those of the third one, hereinafter, explanation will be given only on the difference thereof from the third embodiment.

In this fourth embodiment, at the stage of pre-processing before the crushing, separation is made between the cooling apparatuses 31a including the flammable foaming gas therein and the other disposals 31b than that, which does not includes the flammable gas therein, and the cooling apparatuses 31a including the flammable foaming gas therein are charged into the first crushing machine 3 through the crushing and charging machine 33, while the other disposals 31b than that through the crushing and charging machine 2. When the flammable gas having the concentration of the high level 1, being higher than the normal concentration, is measured, the crushing and charging machine 33 is controlled with priority; i.e., the charge amount is reduced down, and/or further the charging is stopped. Also, when the concentration of the high level 2 is detected by the measuring apparatus 30a of flammable gas concentration, both the crushing and charging machine 2 and the crushing and charging machine 33 are stopped.

With this fourth embodiment, the disposals 31a and 31b containing the foaming heat insulator material therein are charged into the crushing machine 3 by means of the plural number of the charging machines 33 and 2, so that the charging of the disposals 31a into the first crushing machine 3 is controlled with priority, depending upon the measured concentration of the flammable gas, by means of at least either one of the plural number of the charging machines 33 and 2, therefore it is possible to achieve the selective charging of the disposals 31a and 31b having different foaming heat insulator materials therein, with ease. And according to this, it is possible to make the control on the concentration of the flammable gas appropriately, by charging the foaming heat insulator material 31a, including the flammable gas therein, into the charging machine 33 which is controlled with the priority.

As was fully explained in the above, according to the present invention, it is possible to accomplish the collecting method and the collecting apparatus, being able to collect the foaming gas with high efficiency, wherein the concentration of the flammable gas is controlled appropriately, so that the safety of the crushing machine(s) can be obtained with ease if the flammable and inflammable foaming heat insulator materials are mixed with to be charged, as well as, the charge amount of the foaming heat insulator material is controlled depending upon the concentration of the flammable gas. And, it is apparent that those collecting method and collecting apparatus can be applied into a method and an apparatus for processing the disposals, in particulr, containing heat-insulator material, which generates forming gas therefrom.

While we have shown and described the embodiments and variations in accordance with our invention, it should be understood that the disclosed embodiment is susceptible of changes and modifications without departing from the scope of the invention. Therefore, we do not intend to be bound by the details shown and described herein but intend to cover all such changes and modifications falling within the ambit of the appended claims.

What is claimed is:

1. A collecting method for collecting foaming gas from foaming heat insulator material, comprising following steps:
    a step for charging the foaming heat insulator material into a first crushing machine;
    a step for crushing said charged foaming heat insulator material charged by said first crushing machine;
    a step for charging the crushed foaming heat insulator material into a second crushing machine;
    a step for crushing the charged foaming heat insulator material further finely by said second crushing machine;
    a step for collecting the foaming gas from an air, including the foaming gas separated from said foaming heat insulator material in said first crushing machine and said second crushing machine, by means of a collector;
    a step for measuring concentration of flammable gas within the air including the foaming gas separated in said first crushing machine;
    a step for measuring concentration of flammable gas within the air including the foaming gas separated in said second crushing machine;
    a step for controlling the charging of the foaming heat insulator material into said first crushing machine, depending upon a measurement result of concentration in said first crushing machine; and
    a step for controlling the charging of the foaming heat insulator material into said first crushing machine and the charging of the foaming heat insulator material into said second crushing machine, depending upon a measurement result of concentration in said second crushing machine.

2. A collecting method for collecting foaming gas from foaming heat insulator material, comprising following steps:
    a step for separating material into foaming heat insulator material indicating a flammable gas therein and other material;
    a step for charging the foaming heat insulator material into a crushing machine by means of a plurality of charging machines depending upon separation of said foaming heat insulator material in the material separating step;
    a step for separating the foaming gas contained within said foaming heat insulator material charged in said crushing machine;
    a step for collecting the foaming gas from an air, including said separated foaming gas therein, by means of a collector;
    a step for measuring concentration of flammable gas within the air including said separated foaming gas therein; and
    a step for controlling the charging of the foaming heat insulator material into said crushing machine by means of at least one of said plurality of charging machines, with priority, depending upon the measured concentration of the flammable gas.

3. The collecting method according to claim 2, wherein said step for controlling can control charging of the foaming heat insulator material into said crushing machine such that charging of the foaming heat insulator material indicating a flammable gas therein into said crushing machine is at least reduced while charging of said other material into said crushing machine is maintained.

4. A collecting method for collecting foaming gas from foaming heat insulator material, comprising following steps:
    a step for charging disposals into a first crushing machine;
    a step for crushing said charged disposals by means of said first crushing machine;
    a step for separating crushed pieces into one including the foaming heat insulator material and the other than that, by means of a wind power separating apparatus;
    a step for charging the separated pieces, being crushed and including the foaming heat insulator material therein, into a second crushing machine;
    a step for crushing the charged foaming heat insulator material by means of said second crushing machine;
    a step for collecting specific flon and cyclopentane from an air, including the foaming gas separated from said foaming heat insulator material in said first crushing machine and said second crushing machine, independently, by means of an absorbing and liquefying apparatus;
    a step for measuring concentration of the cyclopentane within the air, including the foaming gas separated in said first crushing machine;
    a step for measuring concentration of the cyclopentane within the air, including the foaming gas separated in said second crushing machine;
    a step for controlling the charging of the disposals into said first crushing machine upon basis of a measurement result on the concentration in said first crushing machine;
    a step for controlling the charging of the foaming heat insulator material into said first crushing machine and the charging of the foaming heat insulator material into said second crushing machine, upon basis of a measurement result on the concentration in said second crushing machine.

5. A collecting apparatus for collecting foaming gas from foaming heat insulator material, comprising:
- a charging machine for charging the foaming heat insulator material;
- a first crushing machine for crushing said foaming heat insulator material charged therein;
- a second charging machine for charging the crushed foaming heat insulator material;
- a second crushing machine for crushing the charged foaming heat insulator material more finely than that in said first crushing machine;
- a collector for collecting the foaming gas from an air, including the foaming gas separated from said foaming heat insulator material in said first crushing machine and said second crushing machine therein;
- a first measurement apparatus for measuring concentration of flammable gas within the air, including the foaming gas separated in said first crushing machine therein;
- a second measurement apparatus for measuring concentration of flammable gas within the air, including the foaming gas separated in said second crushing machine therein; and
- a control apparatus for controlling the charging of the foaming heat insulator material into said first crushing machine depending upon the measured concentration in said first crushing machine, as well as, for controlling the charging of the foaming heat insulator material into said first crushing machine and the charging of the foaming heat insulator material into said second crushing machine depending upon the measured concentration in said second crushing machine.

6. A collecting apparatus for collecting foaming gas from foaming heat insulator material, comprising:
- a plural number of charging machines for charging the foaming heat insulator material, including one for charging the foaming heat insulator material indicating a flammable gas therein, and others for charging material other than the foaming heat insulator material indicating a flammable gas therein;
- a crushing machine for crushing said foaming heat insulator material, including the foaming heat insulator material indicating a flammable gas therein and the material other than the foaming heat insulator material indicating a flammable gas therein, charged therein from said plural number of charging machines;
- a collector for collecting the foaming gas from an air, including said separated foaming gas therein;
- a measurement apparatus for measuring concentration of flammable gas within the air, including said separated foaming gas therein; and
- a controller apparatus for controlling the charging of the foaming heat insulator material into said crushing machine by means of at least one of said plurality of charging machines, with priority, depending upon the measured concentration of the flammable gas.

7. The collecting apparatus according to claim 6, wherein said others, of said plural number of charging machines, include a charging machine for charging other foaming heat insulator material than the foaming heat insulator material indicating a flammable gas therein, the other foaming heat insulator material being crushed in the crushing machine.

8. The collecting apparatus according to claim 6, wherein said controller apparatus can control charging of the foaming heat insulator material into said crushing machine such that charging of the foaming heat insulator material indicating a flammable gas therein into said crushing machine is at least reduced while charging of material other than the foaming heat insulator material indicating a flammable gas therein is maintained.

9. A collecting apparatus for collecting foaming gas from foaming heat insulator material, comprising:
- a charging machine for charging disposals;
- a first crushing machine for crushing said charged disposals;
- a wind power separator apparatus for separating crushed pieces into one including the foaming heat insulator material and the other than that;
- a second charging machine for charging the separated pieces, being crushed and including the foaming heat insulator material therein;
- a second crushing machine for crushing the charged foaming heat insulator material;
- an absorbing and liquefying apparatus for collecting specific flon and cyclopentane from an air, including the foaming gas separated from said foaming heat insulator material in said first crushing machine and said second crushing machine, independently;
- a first measurement apparatus for measuring concentration of the cyclopentane within the air, including the foaming gas separated in said first crushing machine;
- a second measurement apparatus for measuring concentration of the cyclopentane within the air, including the foaming gas separated in said second crushing machine; and
- a controller apparatus for controlling the charging of the disposals into said first crushing machine upon basis of a measurement result on the concentration in said first crushing machine, as well as, for controlling the charging of the foaming heat insulator material into said first crushing machine and the charging of the foaming heat insulator material into said second crushing machine, upon basis of a measurement result on the concentration in said second crushing machine.

10. A collecting apparatus for collecting foaming gas from foaming heat insulator material, comprising:
- a charging machine for charging disposals;
- a first crushing machine for crushing said charged disposals;
- a wind power separator apparatus for separating crushed pieces into one including the foaming heat insulator material and the other than that;
- a first dust collector for storing crushed pieces including the separated foaming heat insulator material, temporally, by giving suction force to said wind power separator;
- a second charging machine for charging the crushed pieces, including the foaming heat insulator material therein, upon receipt thereof;
- a second crushing machine for crushing the charged foaming heat insulator material;
- a second dust collector for sucking the air, including the foaming gas from said foaming heat insulator material in said crushing machine and said second crushing machine;
- an absorber supply pipe for supplying the air, including said foaming gas therein, through a supply exchange valve from said second dust collector;
- an absorbing and liquefying apparatus for collecting specific flon and cyclopentane from the supplied air, including the foaming gas therein, independently;

a first measurement apparatus for measuring concentration of the cyclopentane within the air, including the foaming gas separated in said first crushing machine;

a second measurement apparatus for measuring concentration of the cyclopentane within the air, including the foaming gas separated in said second crushing machine; and a controller apparatus for controlling the charging of the disposals into said first crushing machine upon basis of a measurement result on the concentration in said first crushing machine, as well as, for controlling the charging of the foaming heat insulator material into said first crushing machine and the charging of the foaming heat insulator material into said second crushing machine, upon basis of a measurement result on the concentration in said second crushing machine.

* * * * *